US012533776B2

(12) United States Patent
Klomp

(10) Patent No.: US 12,533,776 B2
(45) Date of Patent: Jan. 27, 2026

(54) SCREWDRIVER RATCHETING MECHANISM

(71) Applicants: WINSIRE ENTERPRISES CORPORATION, Langley (CA); CREATOR WAREHOUSE INC., Surrey (CA)

(72) Inventor: Waltherus Christianus Klomp, Delta (CA)

(73) Assignees: WINSIRE ENTERPRISES CORPORATION, Langley (CA); CREATOR WAREHOUSE INC., Surrey (CA)

( * ) Notice: Subject to any disclaimer, the term of this patent is extended or adjusted under 35 U.S.C. 154(b) by 341 days.

(21) Appl. No.: 18/230,064

(22) Filed: Aug. 3, 2023

(65) Prior Publication Data

US 2025/0042003 A1 Feb. 6, 2025

(30) Foreign Application Priority Data

Jul. 6, 2023 (CA) ................................ CA 3205799

(51) Int. Cl.
*B25B 15/04* (2006.01)

(52) U.S. Cl.
CPC .................................... *B25B 15/04* (2013.01)

(58) Field of Classification Search
CPC ....... B25B 13/46; B25B 13/463; B25B 13/48; B25B 13/481; B25B 15/001; B25B 15/02; B25B 15/04; B25B 17/00; B25B 23/007; B25B 23/0014; B25B 23/0035; B25B 23/0042; B25B 23/14; B25B 23/124; B25G 1/025; B25G 1/043; B25G 1/063; B25G 3/02; B25G 3/04; B25G 3/12; B25G 3/22; B25F 5/00
See application file for complete search history.

(56) References Cited

U.S. PATENT DOCUMENTS 5,749,272 A 5/1998 Phan
6,151,994 A 11/2000 Shiao
(Continued)

FOREIGN PATENT DOCUMENTS

EP 0661139 B1 3/1999
EP 0978355 B1 3/2002

*Primary Examiner* — Robert J Scruggs
(74) *Attorney, Agent, or Firm* — David J. McGruder; Oyen Wiggs Green & Mutala LLP

(57) ABSTRACT

A screwdriver with a ratcheting mechanism permitting the direction in which driving force is applied to be selected by the operation of a selector ring (32) which is rotated in the same direction as that in which driving force is applied. Two pawls (36A, 36B) are movable between an engagement position in which the pawl engages a ratchet gear (26) to prevent rotation of the ratchet gear in one direction and a non-engagement position. A pawl-pushing member (50) is movable between a first position in which one pawl is in its engagement position, a second position in which the other pawl is in its engagement position, and a third position in which both pawls are in their engagement position. A pivoting member (52) moves the pawl-pushing member between its first position, its second position and its third position. The selector ring (32) pivots the pivoting member.

3 Claims, 4 Drawing Sheets

(56) References Cited

U.S. PATENT DOCUMENTS

| | | | | |
|---|---|---|---|---|
| 6,854,363 | B2 * | 2/2005 | Ping | B25B 13/468 81/63.1 |
| 11,772,243 | B2 * | 10/2023 | Li | B25B 15/04 81/29 |

* cited by examiner

SCREWDRIVER RATCHETING MECHANISM

FIELD OF THE INVENTION

The invention pertains to ratcheting mechanisms for screwdrivers.

BACKGROUND OF THE INVENTION

Ratcheting screwdrivers have a mechanism whereby rotation of the screwdriver in one direction, either clockwise or counterclockwise, causes the driving force to be in a selected direction, while the handle can rotate freely relative to the screwdriver shaft in the opposite direction. Ratcheting mechanisms permit the user to select the direction of the driving force, by the operation of a switch or actuator. In some ratcheting screwdrivers, the direction of the driving force is opposite to the direction of rotation of a selector mechanism. Examples of ratcheting screwdrivers in the patent literature include EP 0 978 355 (Rowlay), EP 0 661 139 (Thomson), U.S. Pat. No. 5,749,272 (Phan) and U.S. Pat. No. 6,151,994 (Shiao).

It would be desirable to have a ratcheting mechanism that is robust and reliable, requires a minimum of moving parts, and permits the direction in which driving force is applied by the screwdriver to be selected by the operation of a rotatable member which is rotated in the same direction as the direction in which driving force is applied.

SUMMARY OF THE INVENTION

The invention provides a screwdriver with a ratcheting mechanism that permits the direction in which driving force is applied to be selected by the operation of a selector ring which is rotated in the same direction as the direction in which driving force is applied. Two pawls are movable between an engagement position in which the pawl engages a ratchet gear to prevent rotation of the ratchet gear in one direction, and a non-engagement position. A pawl-pushing member is movable between a first position in which one pawl is moved to its engagement position, a second position in which the other pawl is moved to its engagement position, and a third position in which both pawls are in their engagement position. A pivoting member moves the pawl-pushing member between its first position, its second position and its third position. The selector ring is configured to pivot the pivoting member.

According to one aspect of the invention there is provided a ratcheting screwdriver comprising a handle, a shaft and a ratchet mechanism. The ratchet mechanism comprises a housing fixed to the handle, and a ratchet gear mounted in the housing, fixed to the shaft and co-axial therewith. First and second pawls are mounted on the housing, each movable between an engagement position in which the respective pawl engages the ratchet gear to prevent rotation of the ratchet gear in one direction, and a non-engagement position in which the respective pawl is out of engagement with the ratchet gear. The first pawl prevents rotation in one direction and the second pawl prevents rotation in the opposite direction. A pawl-pushing member is mounted on the housing, movable between a first position in which the first pawl is moved out of its engagement position, a second position in which the second pawl is moved out of its engagement position, and a third, neutral position in which both pawls are in their engagement position. A pivoting member is mounted on the housing, pivotable to move the pawl-pushing member between its first position, its second position and its third position. A selector ring is mounted on the housing, configured to pivot the pivoting member.

Further aspects of the invention and features of specific embodiments of the invention are described below.

DETAILED DESCRIPTION

Figure 1:
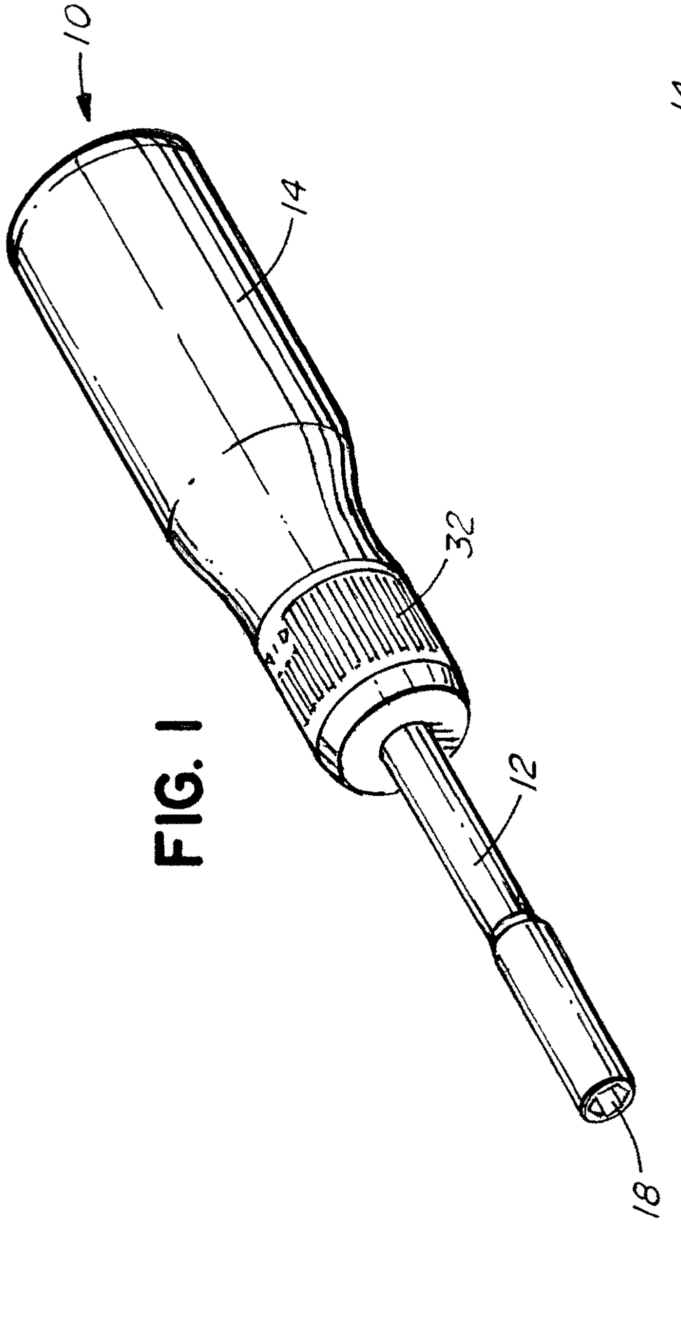
FIG. 1 is a perspective view of an embodiment of the screwdriver with a ratcheting mechanism.

The ratcheting screwdriver 10 has a shaft 12 at its forward end and a handle 14 at its rearward end. The shaft 12 has a hexagonal cavity 18 at its forward end configured to receive hexagonal bits, with a magnet 20 in the base of the cavity to hold a bit in place.

The screwdriver 10 has a ratcheting mechanism 16 at the forward end of the handle. The ratcheting mechanism 16 has a metal housing 22 with an internal cavity 24 which rotatably holds a ratchet gear 26. The shaft 12 is fixed to the forward end of the ratchet gear by a press fit, whereby the shaft and ratchet gear rotate together about a common axis. A thrust bearing 28 is positioned in the cavity 24 at the rearward end of the ratchet gear 26 to allow low friction rotation of the ratchet gear while axial force is being applied. A spline shaft 30 is rigidly fixed into the rearward end of the housing 22 and is press fitted into the handle 14. The handle and the housing are rigidly fixed together.

A selector ring 32 is rotatably fitted over the forward portion of the housing 22. It holds the internal components of the ratcheting mechanism and operates the ratcheting mechanism as explained below.

A shaft collar 34 is fitted in the forward end of the housing 22 to support the shaft 12 in the housing for rotation with the ratchet gear 26.

Two pawls 36A, 36B are movably mounted on the housing 22. The pawls are metal plates having a J-shaped end 38A, 38B for engagement with the teeth 40 of the ratchet gear 26. The other end 42A, 42B of the pawls is straight.

A retention clip 44 is mounted on the housing 22. It holds a spring 46 having two arms 48A, 48B which press against the pawls 36A, 36B respectively to bias them into engagement with the ratchet gear.

A pawl-pushing member 50 is movably mounted on the housing 22. It is a curved member having one end 50A positioned proximate to the second end 42A of one pawl 36A, and the second end 50B positioned proximate to the second end 42B of the other pawl 36B.

Figure 4:
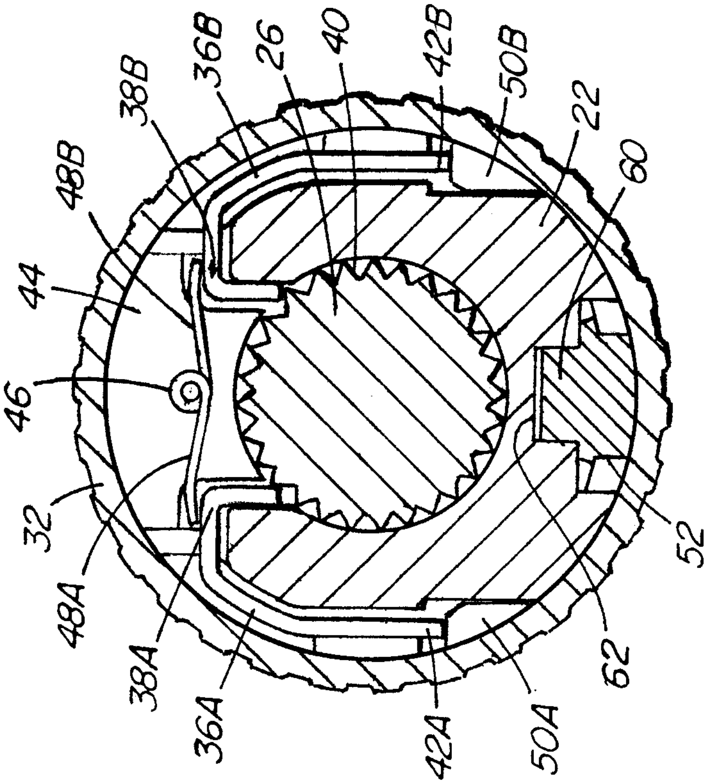
FIG. 4 is an axial cross-sectional view through the ratcheting mechanism, with the ratchet mechanism in a locked position.
Figure 6:
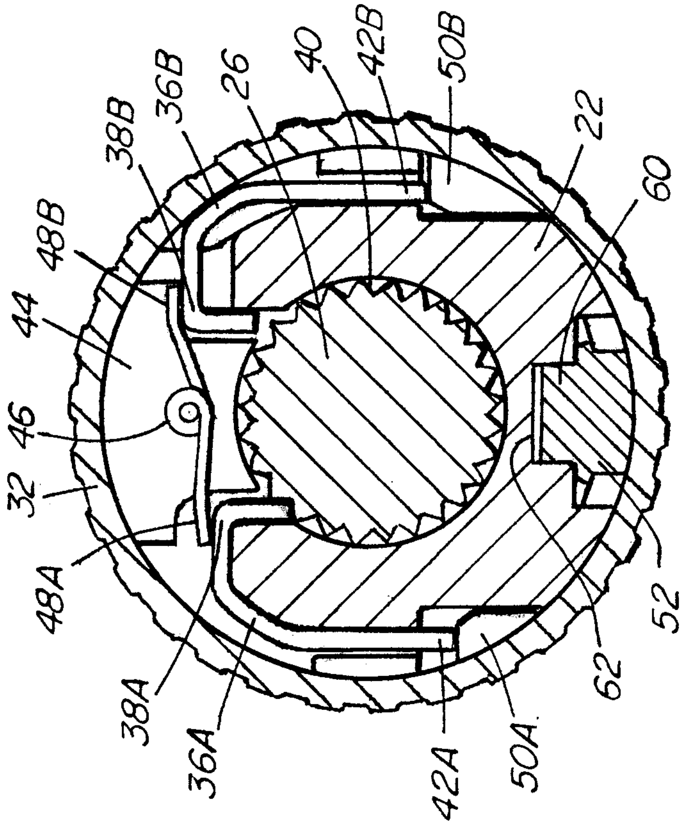
FIG. 6 is an axial cross-sectional view similar to FIG. 4, with the ratcheting mechanism in a second mode in which a driving force can be applied only in the counterclockwise direction.
Figure 5:
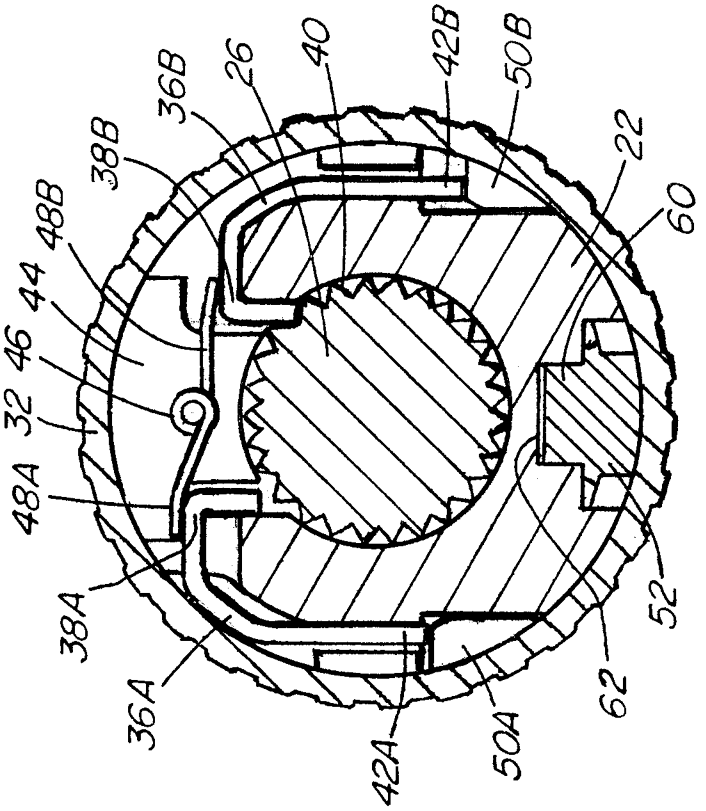
FIG. 5 is an axial cross-sectional view similar to FIG. 4, with the ratcheting mechanism in a first mode in which a driving force can be applied only in the clockwise direction.

The pawl-pushing member 50 is movable between a first position, shown in FIG. 5, a second position shown in FIG. 6, and a third position, shown in FIG. 4.

In the first position (FIG. 5), the first end 50A of the pawl-pushing member 50 engages the second end 42A of one pawl 36A and pushes the pawl 36A out of engagement with the teeth 40 of the ratchet gear 26.

In the second position (FIG. 6), the other end 50B of the pawl-pushing member 50 engages the second end 42B of the other pawl 36B and pushes the pawl 36B out of engagement with the teeth 40 of the ratchet gear 26. When a respective pawl is not moved out of engagement with the ratchet gear, it is held in engagement with the ratchet gear by the biasing force of the spring 46.

In the third position of the pawl-pushing member 50 (FIGS. 4 and 7), which is intermediate between the first and second positions, neither pawl 36A, 36B is pushed out of engagement with the ratchet gear 26. Both pawls are therefore in engagement with it, biased in that position by the spring 46. The ratchet gear 26 and the housing 22 are thus locked together for rotation in both the clockwise and the counterclockwise directions, and a user can transfer torque to the shaft 12 in both directions.

Figure 3:
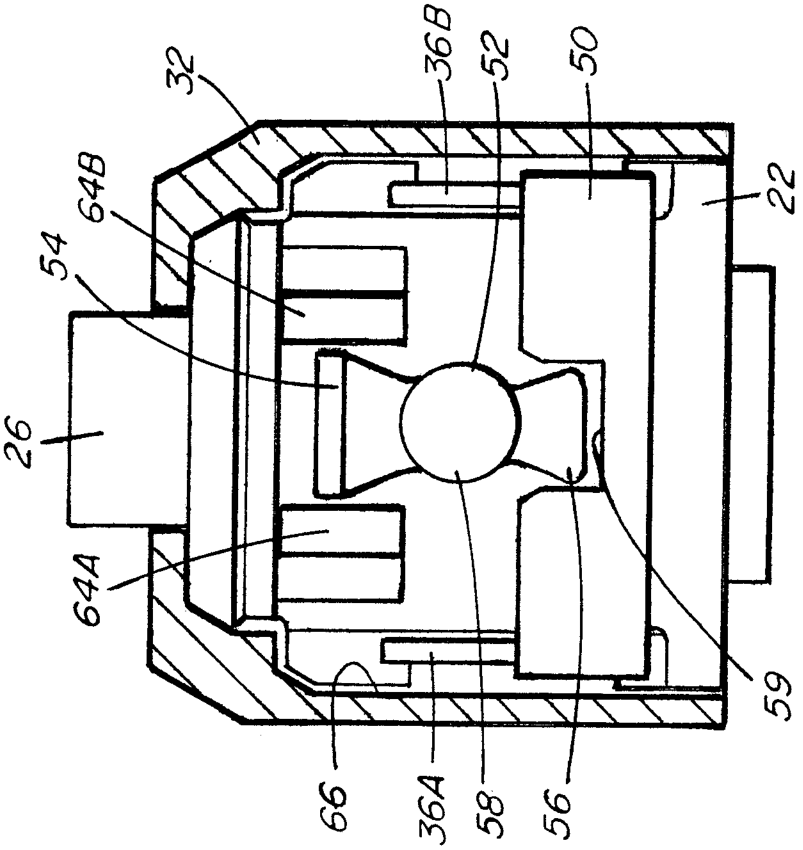
FIG. 3 is a longitudinal cutaway view showing the interaction of the pivoting member of the ratchet mechanism with the selector ring and the pawl-pushing member.
Figure 7:
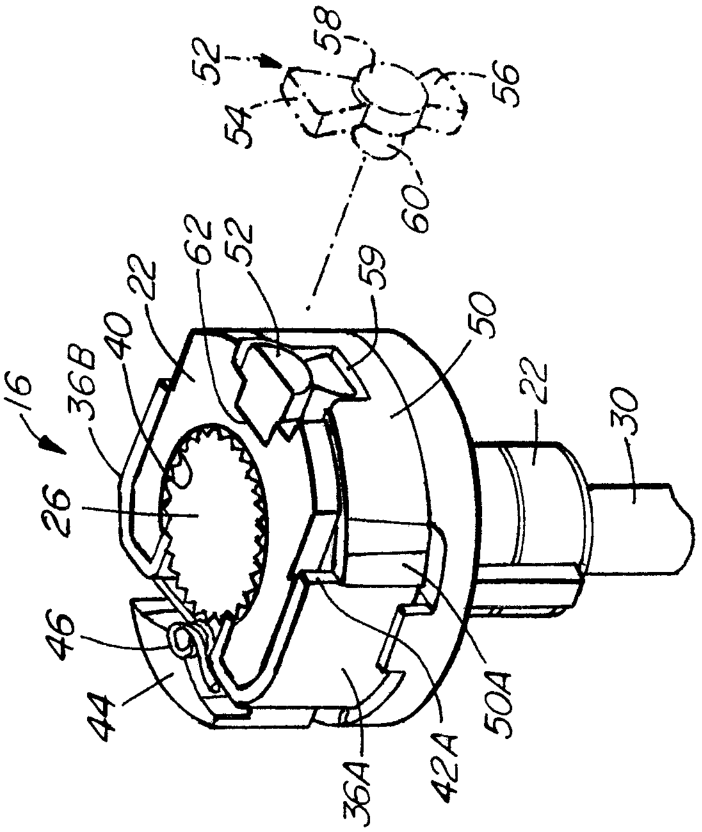
FIG. 7 is a cutaway view of the ratcheting mechanism in the locked position shown in FIG. 4.

As best seen in FIGS. 3 and 7, a pivoting member 52 is mounted on the housing 22. It has a first arm 54, a second arm 56 and a middle section 58 between the two arms. The middle section 58 has a cylindrical post 60 which is rotatably fitted in a cylindrical cavity 62 in the housing 22. The pivoting member 52 is accordingly pivotable about its middle section 58.

The selector ring 32 has two ridges 64A, 64B on its inner side 66. The pivoting member 52 is positioned relative to the selector ring 32 such that the ridges 64 engage the first arm 54 of the pivoting member. The pivoting member 52 is positioned relative to the pawl-pushing member 50 such that the second arm 56 of the pivoting member fits within a slot 59 in the pawl-pushing member.

Rotation of the selector ring 32 in a clockwise direction (as viewed from the rearward end of the screwdriver) causes the ridges 64 to move the first arm 54 of the pivoting member 52 in one direction and thereby rotate the pivoting member. This rotation causes the second arm 56 of the pivoting member to move the pawl-pushing member 50 to its first position (shown in FIG. 5) and push the first pawl 36A out of engagement with the ratchet gear 26. In this position of the selector ring, the second pawl 36B is in engagement with the ratchet gear. The ratchet gear 26 and the housing 22 are accordingly locked for rotation together in one direction (clockwise), and the user can transfer torque to the shaft 12 in that direction. In the opposite direction, the ratchet gear and the housing are not locked for rotation, and the housing rotates freely relative to the shaft.

Rotation of the selector ring 32 in the counterclockwise direction causes the pivoting member 52 to rotate such that the second arm 56 of the pivoting member moves the pawl-pushing member 50 to its second position (shown in FIG. 6) and push the second pawl 36B out of engagement with the ratchet gear. In this position, the first pawl 36A is in engagement with the ratchet gear. The ratchet gear 26 and the housing 22 are locked together for rotation in one direction (counterclockwise), opposite to that described in the preceding paragraph. Likewise, they are not locked together and the housing rotates freely relative to the shaft, in the opposite direction.

Rotation of the selector ring 32 to a point mid-way between the full clockwise and counterclockwise positions places the pawl-pushing member 50 in its third position (shown in FIG. 4), in which both pawls are in engagement with the ratchet gear.

Figure 2:
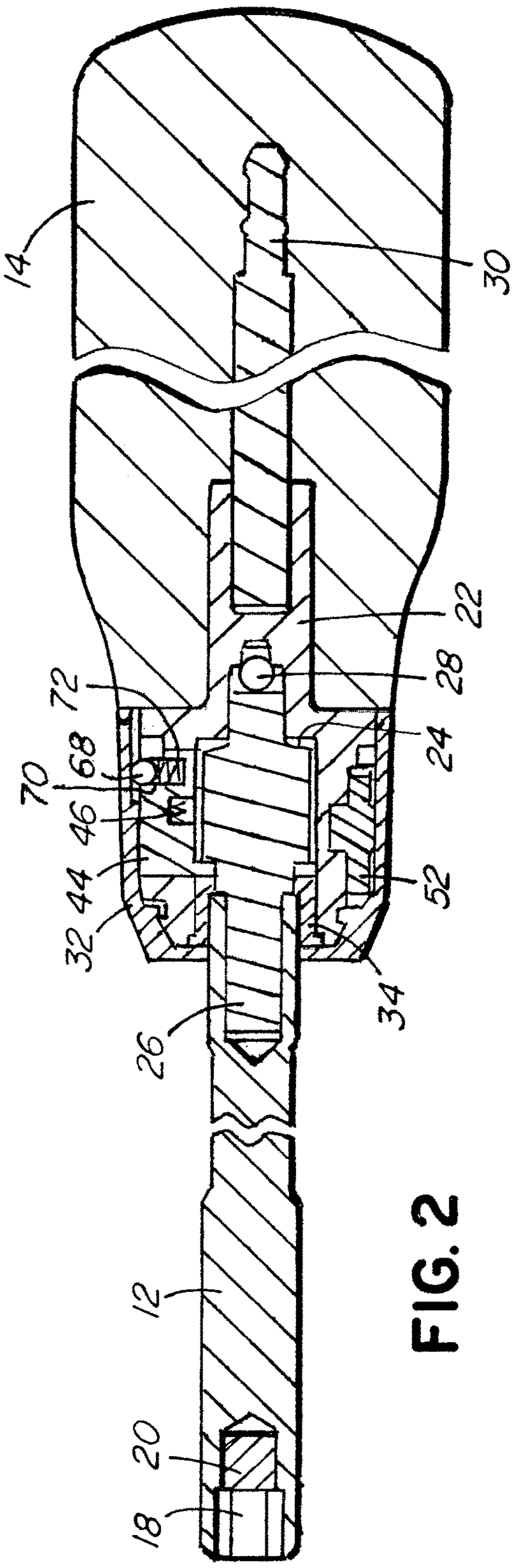
FIG. 2 is an axial cross-sectional view of the screwdriver.
Figure 8:
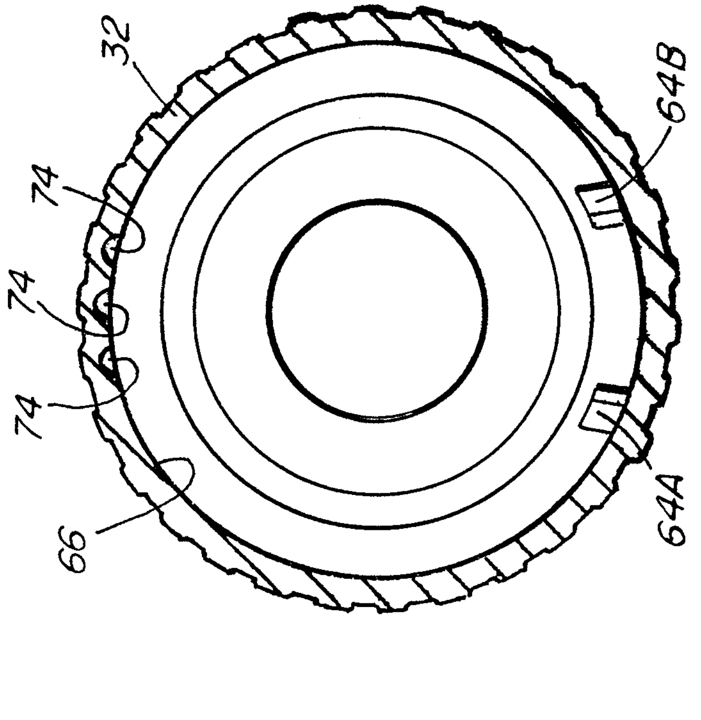
FIG. 8 is a view of the inside of the selector ring.

Referring to FIGS. 2 and 8, an indexing ball 68 located in a cavity 70 in the retention clip 44 is biased by a coil spring 72 towards the inner side 66 of the selector ring 32, where indents 74 are provided to receive the indexing ball 68 and releasably hold the selector ring in the selected position, i.e., the first position, the second position, or the third position as described above.

It will be apparent from the foregoing that in the first position of the pawl-pushing member, shown in FIG. 5, with the selector ring moved in the clockwise direction, the screwdriver applies torque in the clockwise direction, and ratchets freely in the opposite direction; and in the second position of the pawl-pushing member, shown in FIG. 6, with the selector ring moved in the counterclockwise direction, the screwdriver applies torque in the counterclockwise direction. Thus, the direction of rotation of the selector ring and the direction of applied torque are the same.

Throughout the foregoing description and the drawings, in which corresponding and like parts are identified by the same reference characters, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the foregoing disclosure, many alterations and modifications are possible in the practice of this invention without departing from the scope thereof. Accordingly, the scope of the invention is to be construed in accordance with the following claims.

The invention claimed is:

1. A ratcheting screwdriver comprising a handle, a shaft and a ratchet mechanism between the handle and the shaft, the ratchet mechanism comprising:

a housing fixed to the handle;

a ratchet gear rotatably mounted in the housing, fixed to the shaft and co-axial therewith;

first and second pawls mounted on the housing, each movable between an engagement position in which the respective pawl engages the ratchet gear to prevent rotation of the ratchet gear in one direction and a non-engagement position in which the respective pawl is out of engagement with the ratchet gear, the first pawl preventing rotation in a clockwise direction and the second pawl preventing rotation in a counterclockwise direction;

a pawl-pushing member mounted on the housing, movable between a first position in which the first pawl is moved out of its engagement position and the second pawl is in its engagement position, a second position in which the second pawl is moved out of its engagement position and the first pawl is in its engagement position, and a third position in which both pawls are in their engagement position;

a pivoting member mounted on the housing, pivotable to move the pawl-pushing member between its first position, its second position and its third position, the pivoting member having a first arm, a second arm and a middle section between the first arm and the second arm, the pivoting member being pivotable about its middle section, the second arm of the pivoting member being positioned in a slot in the pawl-pushing member; and a selector ring mounted on the housing, configured to pivot the pivoting member, the selector ring having ridges on an inward side thereof positioned to engage the first arm of the pivoting member.

2. A ratcheting screwdriver comprising a handle, a shaft and a ratchet mechanism between the handle and the shaft, the ratchet mechanism comprising:

a housing fixed to the handle;

a ratchet gear mounted in the housing, fixed to the shaft and co-axial therewith, and rotatable about a common axis of the shaft and the ratchet gear;

first and second pawls movably mounted on the housing, each pawl having a first end and a second end, each pawl being movable between an engaging position in which the first end of the respective pawl is in contact with the ratchet gear so as to prevent rotation of the ratchet gear in one direction relative to the housing while permitting rotation of the ratchet gear in the opposite direction, and a non-engaging position in which the first end of the respective pawl is out of contact with the ratchet gear;

a pawl-pushing member movably mounted on the housing, the pawl-pushing member having a first end and a second end, the first end being positioned for engagement with the second end of the first pawl and the second end of the pawl-pushing member being positioned for engagement with the second end of the second pawl, the pawl-pushing member being movable between a first position in which the first pawl is pushed by the pawl-pushing member out of its engaging position with the ratchet gear, a second position in which the second pawl is pushed by the pawl-pushing member out of its engaging position with the ratchet gear, and a third position in which both pawls are in their engagement position;

a pivoting member mounted on the housing, having a first arm, a second arm and a middle section between the first arm and the second arm, the pivoting member being pivotable about its middle section, the second arm of the pivoting member being positioned in a slot in the pawl-pushing member;

a selector ring rotatably mounted on the housing radially outward of the pawls, the pawl-pushing member and the pivoting member, the selector ring having ridges on an inward side thereof positioned to engage the first arm of the pivoting member;

whereby clockwise rotation of the selector ring pivots the pivoting member in a first direction that moves the pawl-pushing member to its first position;

whereby counterclockwise rotation of the selector ring pivots the pivoting member in a second direction that moves the pawl-pushing member to its second position; and whereby rotation of the selector ring to a point between the full clockwise and counterclockwise positions moves the pawl-pushing member to its third position.

3. A ratcheting screwdriver according to claim 2, wherein the pivoting member has a cylindrical post at its middle section rotatably fitted in a cylindrical cavity in the housing.

* * * * *